US006888990B2

United States Patent
Block et al.

(10) Patent No.: US 6,888,990 B2
(45) Date of Patent: May 3, 2005

(54) PACKAGE TO DIE OPTICAL COUPLER HAVING HIGH COUPLING EFFICIENCY AND ALIGNMENT TOLERANCE

(75) Inventors: Bruce A. Block, Portland, OR (US); Brandon Barnett, Beaverton, OR (US); Paul Davids, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/606,322

(22) Filed: Jun. 24, 2003

(65) Prior Publication Data

US 2004/0264868 A1 Dec. 30, 2004

(51) Int. Cl.[7] .............................. G02B 6/00; G02B 6/26; G02B 6/36
(52) U.S. Cl. ............................ 385/50; 385/88; 385/147
(58) Field of Search ....................... 385/2, 8, 14, 50–60, 385/147, 88–90; 361/721, 777, 783

(56) References Cited

U.S. PATENT DOCUMENTS

| | | | | |
|---|---|---|---|---|
| 5,371,822 A | * | 12/1994 | Horwitz et al. ............... | 385/89 |
| 6,118,670 A | * | 9/2000 | Radford et al. ............. | 361/777 |
| 6,789,959 B1 | * | 9/2004 | Conn ........................... | 385/94 |
| 2002/0197025 A1 | * | 12/2002 | Vaganov et al. .............. | 385/92 |
| 2003/0180006 A1 | * | 9/2003 | Loh et al. ..................... | 385/88 |

* cited by examiner

*Primary Examiner*—Akm Enayet Ullah
(74) *Attorney, Agent, or Firm*—Blakely, Sokoloff, Taylor & Zafman LLP

(57) ABSTRACT

In an embodiment of the invention, an optical coupler couples light unidirectionally from integrated circuit package to an integrated circuit die. The package has a large waveguide with a waveguide core that has a low index of refraction. The die has a set of very small waveguide cores that have a high index of refraction relative to the index of refraction of the large waveguide core on the package. The waveguide cores with high index of refraction attract light from the waveguide core with the low index of refraction. No light is coupled back into the large waveguide core. Also, the optical mode of the large waveguide on the package is smaller than a subset of waveguide cores on the die. Thus, light is coupled from the package to the die without the waveguide cores having to be tightly aligned with each other.

19 Claims, 5 Drawing Sheets

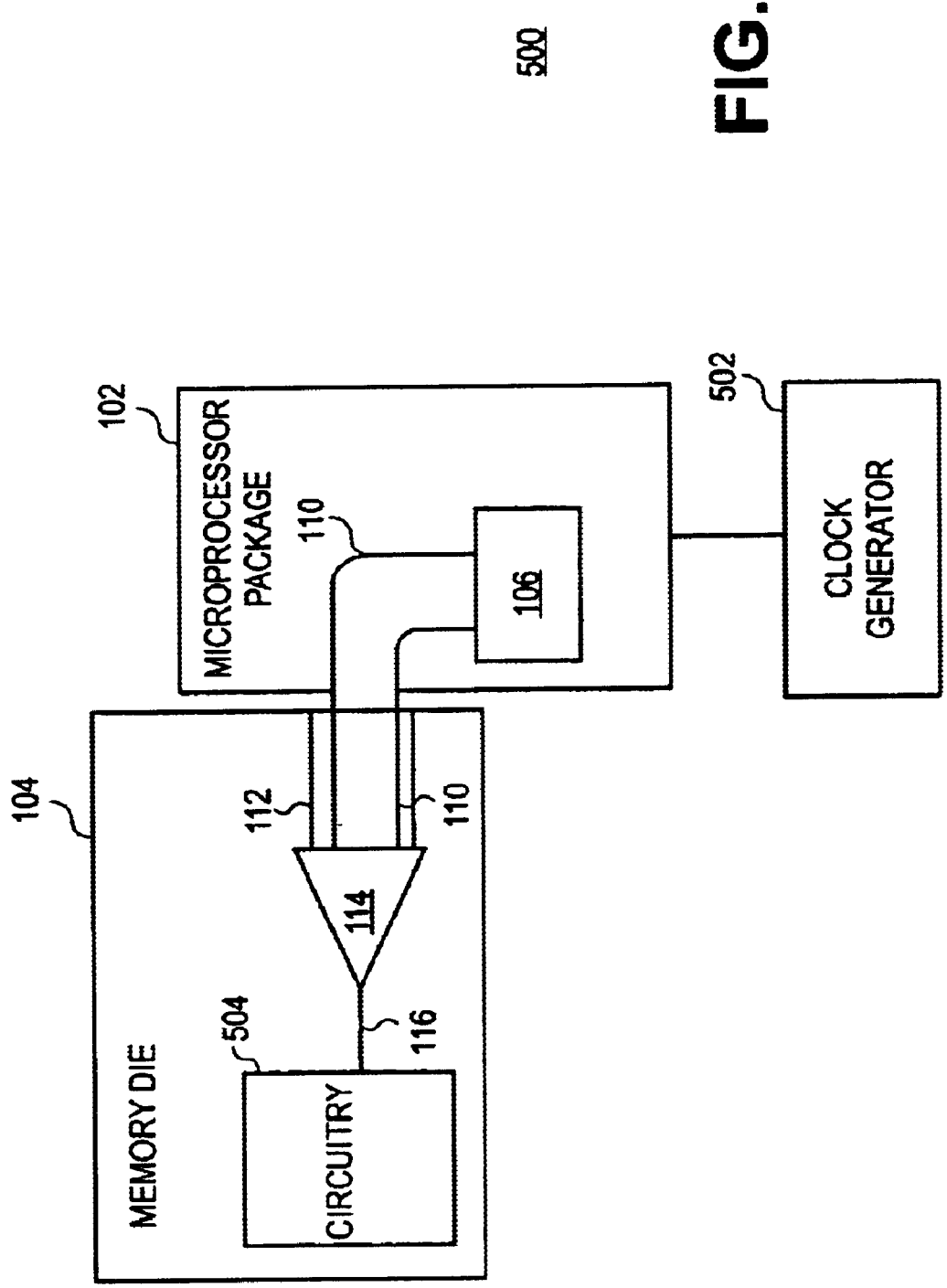

PACKAGE TO DIE OPTICAL COUPLER HAVING HIGH COUPLING EFFICIENCY AND ALIGNMENT TOLERANCE

BACKGROUND

1. Field

Embodiments of the present invention relate to optical communication and, in particular, to optical communication in a computer system.

2. Discussion of Related Art

In optical communication, information is transmitted by way of an optical carrier whose frequency typically is in the visible or near-infrared region of the electromagnetic spectrum. A carrier with such a high frequency is sometimes referred to as an optical signal, an optical carrier, or a lightwave signal. A typical optical communication network includes several optical fibers, each of which may include several channels. A channel is a specified frequency band of an electromagnetic signal, and is sometimes referred to as a wavelength.

Technological advances today contemplate optical communication at the integrated circuit (or chip) level. This is because integrated circuits have size advantages that are attractive in computer systems. Sometimes designers couple an optical signal (light) between two chips, between a chip and a die in the system, or between two dies. This is traditionally accomplished using an optical fiber to couple light between waveguides on dies or chips.

One limitation of using the optical fiber to couple light between waveguides on dies or chips is that this method of coupling is very inefficient. This is because of the physical size difference between a typical communication grade single mode optical fiber and a typical waveguide on a chip or die. The optical fiber is much larger than the waveguide. Because of the size difference the optical signal coupling efficiency is poor. That is, the light from the larger diameter optical fiber does not fit well into the small waveguide. The result can be that received light levels are so low that individual bits in the data stream in the optical signal become indistinguishable. When this happens, the receiving component may not be able to recover the information from the data stream.

Coupling efficiency may be improved by attaching lenses to the optical fiber or by placing a lens between the optical fiber and the waveguide to focus the optical signal into the waveguide. However, coupling efficiency is only fair using lenses. Other coupling methods result in efficiencies that are also fair at best.

This limitation also comes with another challenge: efficient coupling from the optical mode supported by the larger optical fiber to the smaller optical mode supported by the waveguide. The mode is the optical cross-sectional distribution of energy (Gaussian distribution) and is defined by the size of your waveguide (optical fiber, planar waveguide) and the wavelength of the light. There is a large optical mode in the larger optical fiber and a smaller optical mode in the smaller waveguide.

Also coupling from an optical fiber to small on-die waveguides requires very precise alignment. This is typically accomplished with specialized precise manual alignment procedures. Such specialized alignment procedures typically are very expensive and limit practical volumes.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which:

FIG. 5 is a high-level block diagram of an optical system according to an embodiment of the present invention.

DETAILED DESCRIPTION OF THE ILLUSTRATED EMBODIMENTS

Figure 1:
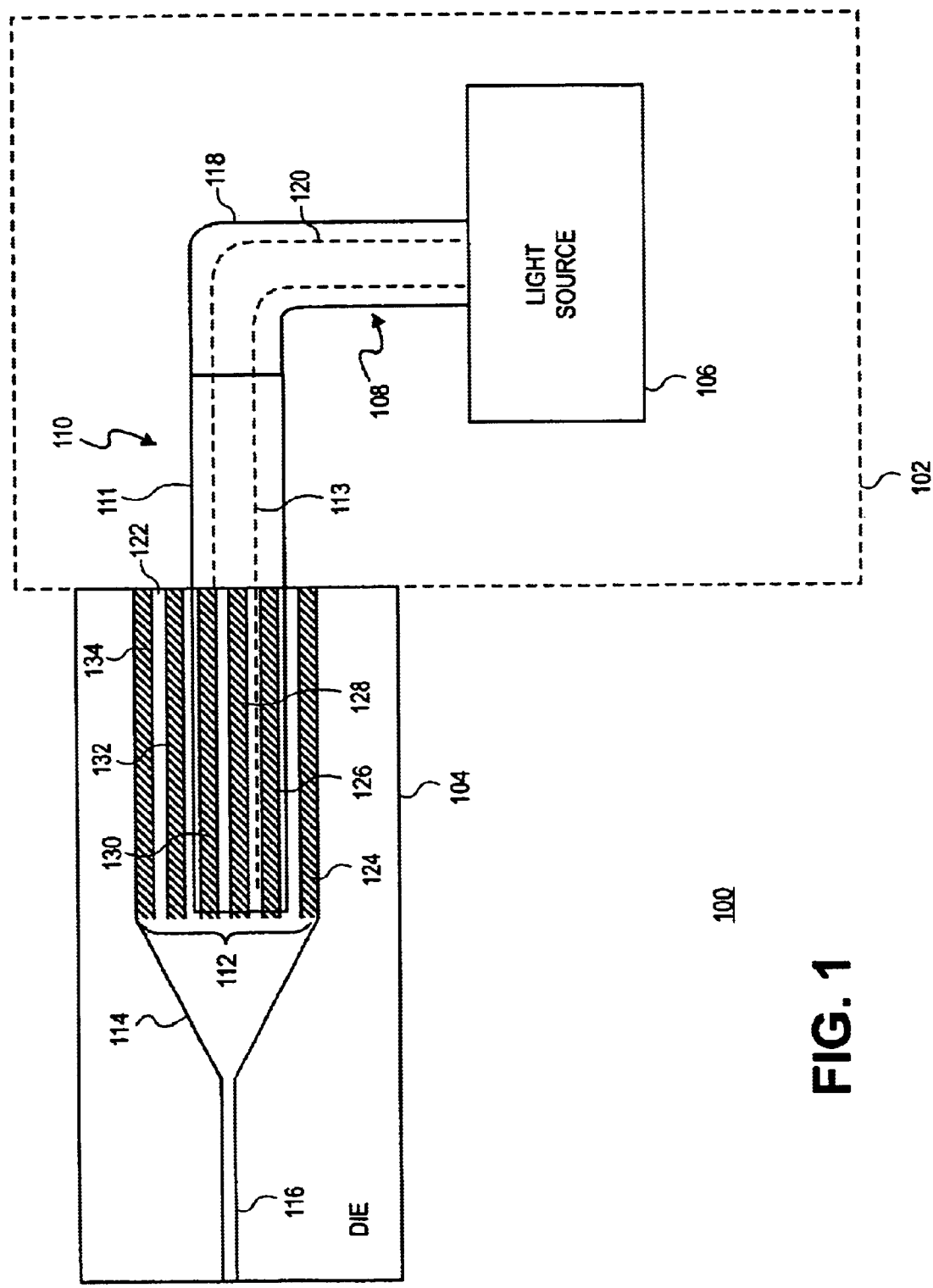
FIG. 1 is a schematic diagram (top view) of an optical coupler according to embodiments of the present invention.

FIG. 1 illustrates a top view of an optical coupler 100 according to an embodiment of the present invention. The example optical coupler 100 includes a semiconductor package 102 a semiconductor die 104.

The example package 102 includes a light source 106 formed in or on the package 102, an optical fiber 108 formed on the package 102, and a waveguide 110 formed in or on the package 102. The light source 106 is coupled to the optical fiber 108 and the optical fiber 108 is coupled to the waveguide 110. The waveguide 110 on the package 102 is optimized to achieve efficient coupling by mode matching to the optical fiber 108. Although not so depicted, in one embodiment of the present invention, the waveguide 110 may located on the die 104 rather than the package 102.

The example die 104 includes a waveguide set 112 formed in or on the die 104, a light combiner 114 formed in or on the die 104, and a waveguide 116 formed in or on the die 104. The waveguide set 112 is coupled to the light combiner 114 and the light combiner 114 is coupled to the waveguide 116.

The example optical fiber 108 includes cladding 118 and a core 120. The cladding 118 surrounds the core 120 and acts to somewhat confine light propagating in the optical fiber 108 to the core 120. The example optical fiber 108 may be a single mode optical fiber having a single optical mode (i.e., optical cross-sectional distribution of energy (Gaussian) defined by the size of the optical fiber 108 and the wavelength of the light propagating in the optical fiber 108). Alternatively, the example optical fiber 108 may be a multimode optical fiber having multiple optical modes that may not have a Gaussian distribution of energy.

The example waveguide 110 may be a planar waveguide having a cladding 111 and a core 113. The cladding 111 acts to somewhat confine light propagating in the waveguide 110 to the core 113. The cladding 110 and the core 113 may be formed in or on the package 102.

The example combiner 114 may be a planar waveguide that is tapered to be wide at one end to receive light from the waveguide set 112 and narrow at the other end to merge the waveguides in the waveguide set 112 into the waveguide 116. The combiner 114 also may have a core (not shown) and a cladding (not shown). The cladding acts to somewhat confine light propagating in the combiner 114 to the core.

In an alternative embodiment of the present invention, subsets of waveguides in the waveguide set 112 may be combined into smaller subsets to merge the light into a single waveguide for that subset. The resulting single waveguides may be merged into another single waveguide. For example, pairs of waveguides can be merged and the resulting pairs merged into the waveguide 116.

The example waveguide 116 may be a planar waveguide that is as narrow as the width of the small end of the combiner 114. The waveguide 116 also may have a core (not shown) and a cladding (not shown). The cladding acts to somewhat confine light propagating in the waveguide 116 to the core. In one embodiment, the waveguide 116 is much narrower than waveguide 110 and couples light from the combiner 114 to other areas on the die 104.

The example waveguide set 112 includes cladding 122 and several waveguide cores 124, 126, 128, 130, 132, and 134. The waveguide cores 124, 126, 128, 130, 132, and 134 are formed in or on the die 104. The cladding 122 also is formed in or on the die 104. The cladding 122 acts to somewhat confine light propagating in the waveguide set 112 to the waveguide cores 124, 126, 128, 130, 132, and 134.

The example package 102 may be any suitable integrated circuit package capable of generating, transporting, transmitting, etc., an optical signal. The example die 104 may be any suitable integrated circuit die capable of receiving an optical signal.

In one embodiment, the die 104 includes a microelectronic component placed within an opening in a microelectronic package core and secured with an encapsulation material. A laminated inter-connector of dielectric materials and conductive traces is then attached to the microelectronic component and the microelectronic package core to form a microelectronic device.

In an alternative embodiment, the die 104 includes a microelectronic component encapsulated within an encapsulation material without a microelectronic package core. A laminated inter-connector of dielectric materials and conductive traces is then attached to the microelectronic component and the encapsulation material to form a microelectronic device.

Alternatively still, the die 104 includes a microelectronic component secured within an opening in a heat spreader. A laminated inter-connector of dielectric materials and conductive traces is then attached to the microelectronic component and the heat spreader to form a microelectronic device.

The example light source 106 may be any suitable device capable of transmitting or coupling an optical signal. For example, the light source 106 may be a laser, an optical fiber transporting an optical signal from a remote location, a waveguide, optical amplifiers, etc.

Figure 2:
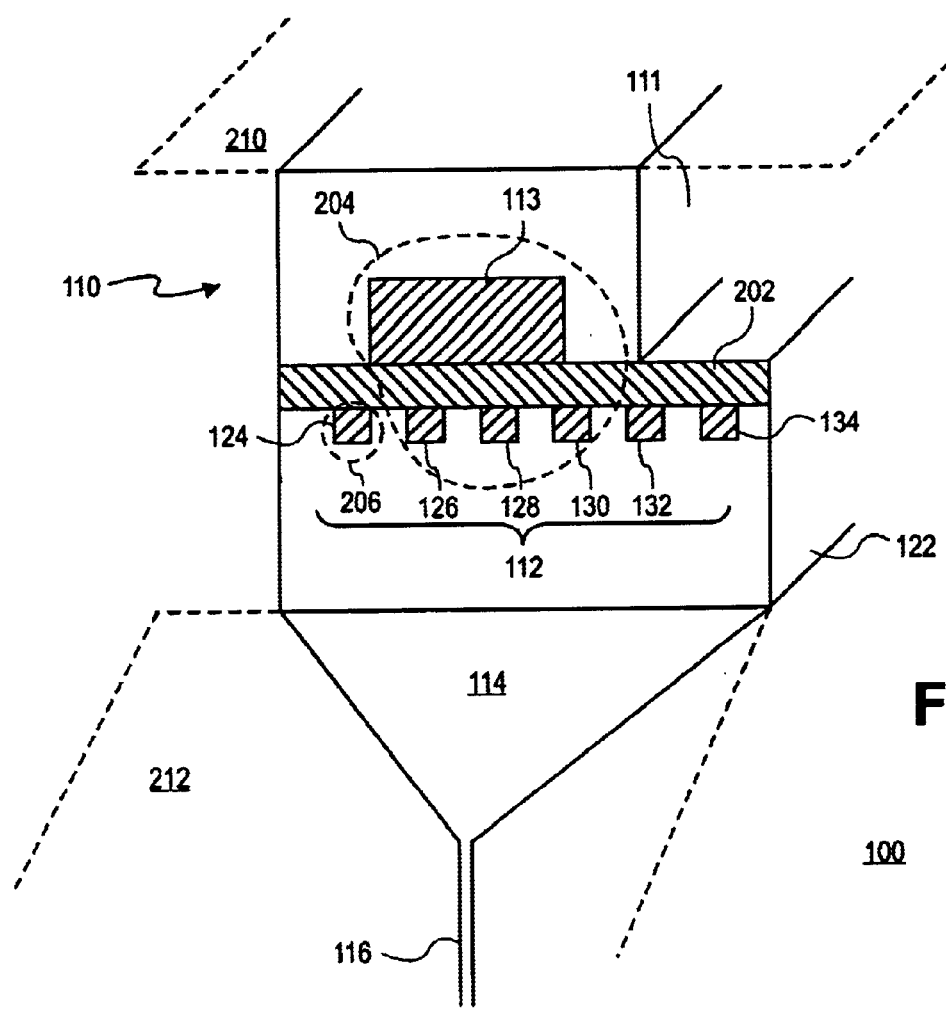
FIG. 2 is a schematic diagram (side view) of the optical coupler in FIG. 1 according to an embodiment of the present invention.

FIG. 2 is a cross-sectional view of the optical coupler 100 according to an embodiment of the present invention. FIG. 2 shows the waveguide 110 attached to the waveguide set 112 via a cladding 202, which may be a thin (sub-micron) film. The cladding 111 partially surrounds the waveguide core 113 and the cladding 202 forms a boundary layer between the waveguide 110 and the waveguide set 112.

The cladding 122 partially surrounds the waveguide cores 124, 126, 128, 130, 132, and 134 and with the cladding 202 the example waveguide set 112 effectively includes six waveguides (i.e., the waveguide core 124 and the cladding 122, the waveguide core 126 and the cladding 122, the waveguide core 128 and the cladding 122, the waveguide core 130 and the cladding 122, the waveguide core 130 and the cladding 122, the waveguide core 132 and the cladding 122, and the waveguide core 134 and cladding 122). Only six waveguide cores are shown for simplicity. After reading the description herein, persons of ordinary skill in the relevant art will readily recognize how to implement embodiments of the present invention for more or fewer than six waveguide cores in a waveguide set.

The example waveguide 110 may be a single mode waveguide having a single optical mode whose Gaussian energy distribution defined by the size of the waveguide 110 and the wavelength of the light propagating in the waveguide 110. The size of the waveguide 110 may be such that its mode is matched to the mode of any known communication grade single mode optical fiber. For example, the width of the waveguide 110 may be approximately one hundred twenty-five microns and its core approximately 10 microns.

A phantom line 204 illustrates an example optical mode of the waveguide 110 according to an embodiment of the present invention. Note that the width of the waveguide set 112 is greater than the optical mode of the waveguide 110 to allow misalignment of the large waveguide to the waveguide set 112. However, the width of a subset of waveguides in the waveguide set 112 is smaller than the optical mode of the waveguide 110 to achieve maximum overlap between the optical mode of the large waveguide 204 and the modes supported by the waveguide set 206 to improve coupling efficiency.

Any or all of the waveguides in the waveguide set 112 may be a single mode waveguide having a single optical mode whose Gaussian energy distribution defined by the size of the waveguide and the wavelength of the light propagating in the waveguide. The width of each waveguide in the waveguide set 112 may be typical of any known waveguide in a planar lightwave circuit. For example, the width of each waveguide in the waveguide set 112 may be substantially smaller than a micron. A phantom line 206 illustrates an example optical mode of the waveguide 124 in the waveguide set 112, which is smaller than the optical mode of the waveguide 110.

The cladding 111, the core 113, the cladding 122, the waveguide cores 124, 126, 128, 130, 132, and 134, and the cladding 202 each have an index of refraction. The index of refraction of the cladding 111 and the cladding 202 is lower than the index of refraction of the core 113, but not by much, creating a low index contrast waveguide. The index of refraction of the cladding 122 is much lower than the indices of refraction of the waveguide cores 124, 126, 128, 130, 132, and 134, creating high index contrast waveguides. The index of refraction of the core 113 is much smaller than the index of refraction of the waveguide cores 124, 126, 128, 130, 132, and 134. Index contrast, in addition to providing unidirectional operation, allows a mode conversion from large mode to small mode that can be used on a chip.

Figure 3:
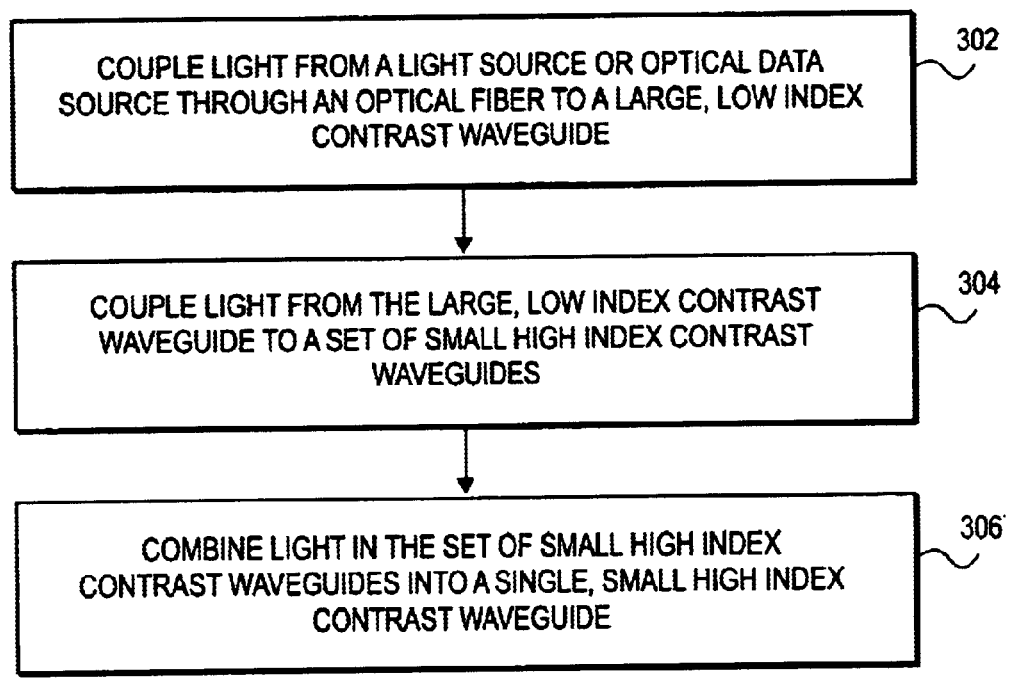
FIG. 3 is a flowchart illustrating an approach to operating the optical coupler in FIG. 1 according to an embodiment of the present invention.

FIG. 3 is a flowchart illustrating a process 300 for operating the optical coupler 100 according to an embodiment of the present invention. Of course, this is only an example process and other processes may be used. The process 300 will be described as multiple discrete operations performed in turn in a manner that is most helpful in understanding embodiments of the present invention. However, the order in which the operations are described should not be construed to imply that the operations are necessarily order dependent or that they be performed in the order in which they are presented.

In a block 302, light is coupled from a light source or optical data source through an optical fiber to a large, low index contrast waveguide. In one embodiment of the present invention, light from the light source 106 is coupled to the waveguide 110.

In a block 304, light is coupled from the large, low index contrast waveguide to a set of small high index contrast waveguides. In one embodiment, light from the waveguide 110 is coupled into the waveguide cores 126, 128, and 130. Because the index of refraction of the core 113 is much smaller than the index of refraction of the waveguide cores 124, 126, 128, 130, 132, and 134, because the size of the waveguide 110 is much larger than the size of the waveguides in the waveguide set 112, and because the optical mode of the waveguide 106 is much larger than the optical modes of the waveguides in the waveguide set 112, the coupling of light from the waveguide 110 into the waveguides in the waveguide set 112 is unidirectional.

In one embodiment, the waveguide cores 124, 126, 128, 130, 132, and 134 are closely spaced and run parallel to each other for the entire coupling distance. The higher index of refraction of the waveguide cores 126, 128, and 130 relative to the index of refraction of the core 113 couples light from the waveguide 110 through the cladding 202. The optical mode in the waveguide 110 is large enough to allow light to couple from the single waveguide 110 to the waveguide cores 126, 128, and 130.

In a block 306, light in the set of small high index contrast waveguides is combined into a single, small high index contrast waveguide. In one embodiment of the present invention, light propagates in the waveguide set 112 and the combiner 114 couples light from the waveguide set 112 to the waveguide 116. The waveguide 116 propagates light to other circuitry on the die 104.

When the package 102 is attached to the die 104, the waveguide set 112 is designed such that the waveguide 110 will fall within the waveguide set 112. As long as the waveguide set 112 is large enough, some of the waveguides in the waveguide set 112 are under the waveguide 110 regardless of misalignment. This feature allows for greater alignment tolerance than known optical couplers. Moreover, coupling efficiency is independent of the accuracy of alignment of the waveguide 110 to the waveguide set 112.

The optical coupler 100 and other embodiments of the present invention may be fabricated using standard semiconductor fabrication techniques, such as (plasma-enhanced) chemical vapor deposition, implantation, doping, evaporation, physical vapor deposition, ion assisted deposition, photolithography, magnetron sputtering, electron beam sputtering, diffusion from spin-on solutions, masking, reactive ion etching, and/or other semiconductor fabrication techniques known to those skilled in the art.

For example, in one embodiment of the present invention, the cladding 122 may be silicon oxide (SiO), a polymer (e.g., poly(methyl methacrylate (PMMA)), polymide, polycarbonate, etc.), a carbon doped oxide, a low nitrogen concentration oxynitride, or other suitable material deposited on a substrate 212 of the die 104, using thermal oxidation, for example. A layer of silicon (Si), silicon nitride ($Si_3N_4$), titanium oxide ($TiO_2$), silicon carbide, or other transparent material having an index of refraction greater than approximately 1.8 may be deposited on the cladding 122 using flame hydrolysis deposition or chemical vapor deposition, for example, to form the waveguide cores 124, 126, 128, 130, 132, and 134. The amount and/or type of material (and/or its dopants) may be varied to control the index of refraction of the waveguide cores 124, 126, 128, 130, 132, and 134 to maintain a high index of refraction contrast to the low index of refraction contrast of the waveguide core 113 to ensure unidirectional coupling of light from the waveguide 113 to the waveguide cores 124, 126, 128, 130, 132, and 134. Material choice also depends on the wavelength of light being used to carry the data.

The cladding 111 in one embodiment may be oxynitride, silicon oxide (SiO), a carbon doped oxide, a polymer, a carbon doped oxide, or other suitable material deposited on a substrate 210 of the package 102 using thermal oxidation, for example. A layer of oxynitride, silicon oxide (SiO), or a polymer may be deposited on the cladding 111 using flame hydrolysis deposition or chemical vapor deposition, for example, to form the waveguide core 113.

The cladding 202 in one embodiment of the present invention may be silicon oxide (SiO), a polymer, a carbon doped oxide, a low nitrogen concentration oxynitride, or other suitable material deposited on the substrate 212 and the waveguide cores 124, 126, 128, 130, 132, and 134 of the die 104, using thermal oxidation, for example, and between the cladding 111 and the waveguide core 113.

Although illustrated as a planar waveguide 110 coupled to a waveguide set 112, in an alternative embodiment of the present invention the waveguide 110 may be a single mode optical fiber. In this embodiment, the optical fiber has an optical mode whose Gaussian energy distribution defined by the size of the optical fiber and the wavelength of the light propagating in the optical fiber. The size of the optical fiber may be typical of any known communication grade single mode optical fiber. For example, the width may be of the optical fiber may be approximately one hundred twenty-five microns and the width of the waveguides in the waveguide set 112 is smaller than the optical mode of the optical fiber.

Figure 4:
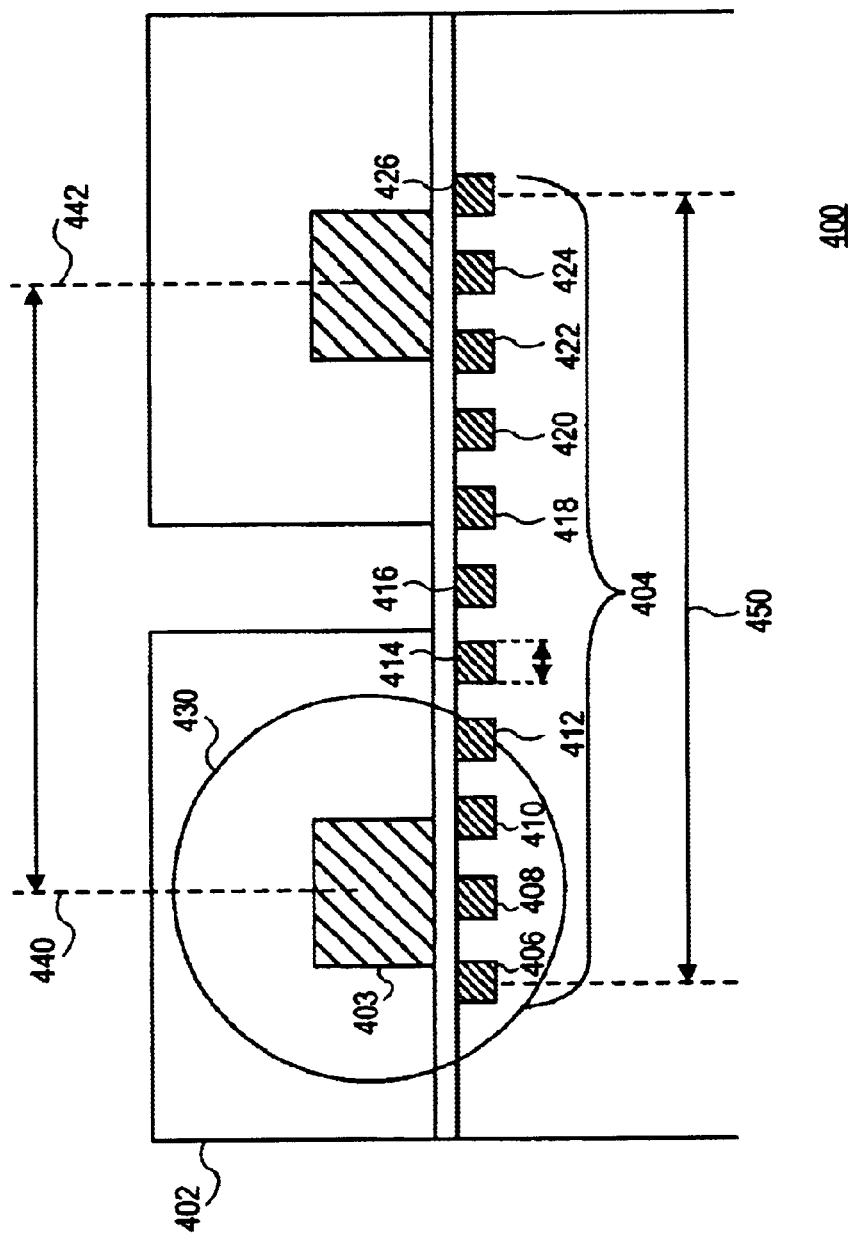
FIG. 4 is a schematic diagram illustrating alignment tolerance of an optical coupler according to an alternative embodiment of the present invention.

FIG. 4 is a schematic diagram illustrating alignment tolerance of an optical coupler 400 according to an alternative embodiment of the present invention. The optical coupler includes a waveguide 402 and a waveguide set 404. The waveguide 402 includes a waveguide core 403. The waveguide set 404 includes eleven waveguide cores 406, 408, 410, 412, 414, 416, 418, 420, 422, 424, and 426. The waveguide core 403 is larger than the waveguide cores 406, 408, 410, 412, 414, 416, 418, 420, 422, 424, and 426. The waveguide 402 includes an optical mode 430 that is larger than the waveguide cores 406, 408, 410, 412, 414, 416, 418, 420, 422, 424, and 426. The waveguides in the waveguide set 404 includes a width 450.

As FIG. 4 illustrates, as the waveguide 402 moves from a position 440 to a position 442 during alignment and placement of the waveguide 402 with the waveguide set 404, the optical mode 430 goes from overlapping the waveguide cores 406, 408, 410, and 412 to overlapping the waveguide cores 422, 424, and 426. This is because the width of the waveguide set 404 is larger than the width of the waveguide 402 but the optical mode 430 is maintained smaller than the width of any subset of the waveguide cores 406, 408, 410, 412, 414, 416, 418, 420, 422, 424, and 426.

In an alternative embodiment of the present invention, there are ten small waveguide cores one micron wide each, the large waveguide core is five microns wide, and the waveguide set width is three microns. In this embodiment, the alignment tolerance of the optical coupler is twenty-one microns.

FIG. 5 is a high-level block diagram of a computer system 500 according to an embodiment of the present invention. The system 500 includes the package 102, the die 104, and a clock generator 502.

The example package 102 is a microprocessor package and includes the light source 106 waveguide 110 disposed therein or thereon. The clock generator 502 may provide a clock signal to the light source 106. The light source 106 may provide an optical clock signal (light modulated by the clock signal) to a microprocessor on the microprocessor package 102.

The example die 104 is a memory die and includes the waveguide set 112, the light combiner 114, the waveguide 116, and other memory circuitry 504 formed therein or thereon. The waveguide 110 may unidirectionally couple the optical clock signal from the microprocessor package 102 to the waveguide set 112 on the memory die 104. Suitable memory dies include any known dynamic random access memory (DRAM), static RAM (SRAM), Flash memory, etc.

The clock generator 502 may be a phase-locked loop clock generator. The clock generator may have a voltage-controlled oscillator. Phase-locked loop clock generators with voltage-controlled oscillators are well known.

The circuitry 504 may be a memory array, memory cells, or other circuitry on a known memory die. The waveguide 116 may couple the optical clock signal to DRAM, SRAM, or Flash memory.

The above description of illustrated embodiments of the invention is not intended to be exhaustive or to limit embodiments of the invention to the precise forms disclosed. While specific embodiments of, and examples for, the invention are described herein for illustrative purposes, various equivalent modifications are possible, as those skilled in the relevant art will recognize. These modifications can be made in light of the above detailed description.

In the above description, numerous specific details, such as particular processes, materials, devices, and so forth, are presented to provide a thorough understanding of embodiments of the invention. One skilled in the relevant art will recognize, however, that the embodiments of the present invention can be practiced without one or more of the specific details, or with other methods, components, etc. In other instances, well-known structures or operations are not shown or described in detail to avoid obscuring the understanding of this description.

Reference throughout this specification to "one embodiment" or "an embodiment" means that a particular feature, structure, process, block, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed is:

1. An apparatus, comprising:
   a first waveguide core disposed in or on an integrated circuit package, the first waveguide core a first index of refraction and a first width
   a set of wave guide cores disposed in or on an integrated circuit die, each waveguide core in the set of waveguide cores having a second index of refraction higher than the first index of refraction and a second width smaller than the first width;
   a cladding material disposed between the first waveguide core and the set of waveguide cores to mount the first waveguide to the set of waveguides;
   a tapered waveguide disposed in or on the integrated circuit die and coupled to the set of waveguide cores; and
   a planar waveguide formed in or on the integrated circuit die and coupled to the tapered waveguide.

2. The apparatus of claim 1, further comprising an optical fiber disposed on the integrated circuit package and coupled to the first waveguide core.

3. The apparatus of claim 2, further comprising a light source disposed in or on the integrated circuit package and coupled to the optical fiber.

4. The apparatus of claim 1, further comprising a second cladding material disposed on the first waveguide core, the second cladding material having a third index of refraction smaller than the first index of refraction.

5. The apparatus of claim 1, further comprising a second cladding material disposed under the set of waveguide cores.

6. An apparatus, comprising:
   a first waveguide disposed in or on an integrated circuit package, the first waveguide supporting a single or multiple optical modes;
   a waveguide set disposed in or on an integrated circuit die, the optical modes of the first waveguide being larger than a width of a subset of waveguides in the set of waveguides;
   a light combiner formed in or on the integrated circuit die and coupled at one end to the waveguide set; and
   a second waveguide formed in or on the integrated circuit die and coupled at a second end to the light combiner.

7. The apparatus of claim 6, wherein the waveguide set is mounted to the first planar waveguide using a thin film of cladding material.

8. The apparatus of claim 7, wherein a width of the waveguide set is larger than a width of the first waveguide.

9. A method, comprising:
   propagating light in a first waveguide core disposed in or on an integrated circuit package;
   coupling the light to a subset of waveguide cores in a waveguide core set disposed in or on an integrated circuit die, the first waveguide core having a first index of refraction, each waveguide core in the waveguide core set having a second index of refraction, the first index of refraction being smaller than the second indices of refraction;
   merging light from the waveguide core set to a waveguide disposed in or on the integrated circuit die; and
   propagating the merged light to a waveguide disposed in or on the integrated circuit die.

10. The method of claim 9, further comprising propagating light from an optical fiber to the first waveguide core.

11. The method of claim 8, further comprising propagating light from a light source into an optical fiber.

12. The method of claim 9, further comprising propagating light from the waveguide to integrated circuit die circuitry.

13. A system, comprising:
   a microprocessor package having a first waveguide disposed therein or thereon, the first waveguide having an optical mode; and
   a static random access memory (SRAM) die having:
      a waveguide set disposed therein or thereon, the optical mode of the first waveguide being larger than a width of a subset of waveguides in the set of waveguides;
      a light combiner formed in or on the SRAM die and coupled at one end to the waveguide set; and
      a second waveguide formed in or on the SRAM die and coupled at a second end to the light combiner.

14. The system of claim 13, further comprising a clock generator coupled to the microprocessor package.

15. The system of claim 14, further comprising a phase-locked loop clock generator coupled to the microprocessor package.

16. The system of claim 13, further comprising SRAM cells coupled to the second waveguide.

17. An apparatus, comprising:

a first waveguide core disposed in or on an integrated circuit die, the first waveguide core a first index of refraction and a first width;

a set of waveguide cores disposed in or on the integrated circuit die, each waveguide core in the set of waveguide cores having a second index of refraction higher than the first index of refraction and a second width smaller than the first width;

a cladding material disposed between the first waveguide core and the set of waveguide cores to mount the first waveguide to the set of waveguides;

several waveguide combiners disposed in or on the integrated circuit die, each waveguide combiner coupled to at least two waveguide cores in the set of waveguide cores; and a planar waveguide formed in or on the integrated circuit die and coupled to the waveguide combiners.

18. The apparatus of claim 17, further comprising an optical fiber coupled to the first waveguide core.

19. The apparatus of claim 18, further comprising a light source coupled to the optical fiber.

* * * * *